United States Patent [19]
Engel

[11] 3,815,828
[45] June 11, 1974

[54] IMPERFORATE DISPENSER FOR DISPENSING VOLATILE MATTER AS GAS AND/OR VAPOR TO A SURROUNDING ATMOSPHERE AND METHOD FOR FORMING SAME

[75] Inventor: Walter H. Engel, Southport, Conn.
[73] Assignee: Porosan Interests, U.S.A., Inc., Fairfield, Conn.
[22] Filed: July 28, 1972
[21] Appl. No.: 276,221

[52] U.S. Cl. .................................... 239/56, 239/6
[51] Int. Cl. ........................ A24f 25/00, A61j 15/00
[58] Field of Search ............................ 239/6, 53–56

[56] References Cited
UNITED STATES PATENTS

| | | | |
|---|---|---|---|
| 3,343,664 | 9/1967 | Poitras | 239/56 |
| 3,567,118 | 3/1971 | Shepherd et al. | 239/053 |
| 3,578,545 | 5/1971 | Carson et al. | 239/53 |
| 3,623,659 | 11/1971 | Maierson et al. | 239/56 |
| 3,685,734 | 8/1972 | Paciorek | 239/54 |
| 3,688,985 | 9/1972 | Engel | 239/54 |
| 3,702,677 | 11/1972 | Heffington | 239/55 |

Primary Examiner—Lloyd L. King
Attorney, Agent, or Firm—Arthur T. Fattibene

[57] ABSTRACT

This disclosure is directed to an article for dispensing volatile matter as a gas and/or vapor in a chemically unchanged state to the surrounding atmosphere. This is attained by confining either an aqueous emulsion comprising a volatile matter formed with the help of a surfactant and/or pad impregnated or over-saturated with volatile matter in an hermetically sealed, liquid impervious envelope or container formed of a water insoluble vinyl polymer, co-polymer or derivative thereof. The internal walls of the envelope being disposed contiguous the aqueous emulsion or impregnated pad are readily wetted or influenced thereby to result in a gradual yielding of the volatile matter therein through the liquid impervious walls of the envelope as a gas or vapor in a chemically unchanged, dry state to the surrounding atmosphere. To enhance the release of the volatile contained in the aqueous emulsion through the walls of the envelope, the envelope is externally impregnated with an aqueous emulsion of a volatile material formed with the help of a surfactant or emulsifier.

11 Claims, 5 Drawing Figures

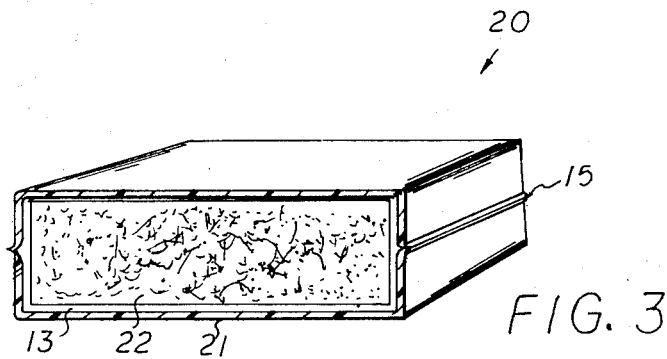
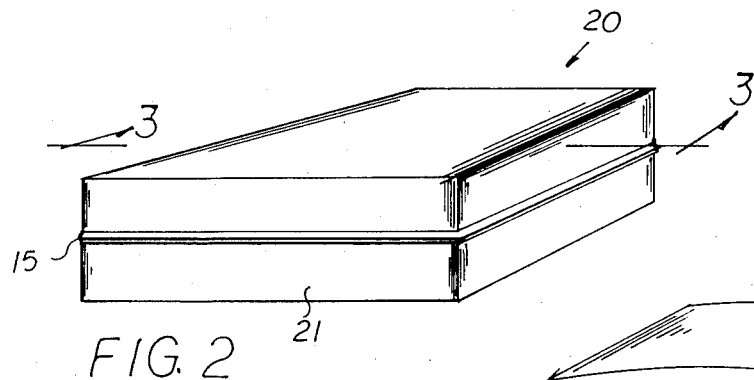
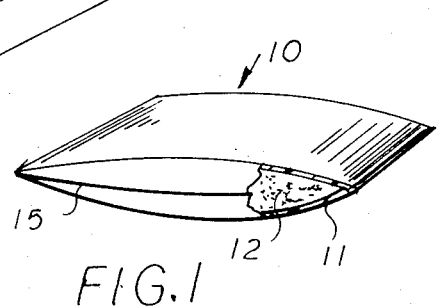
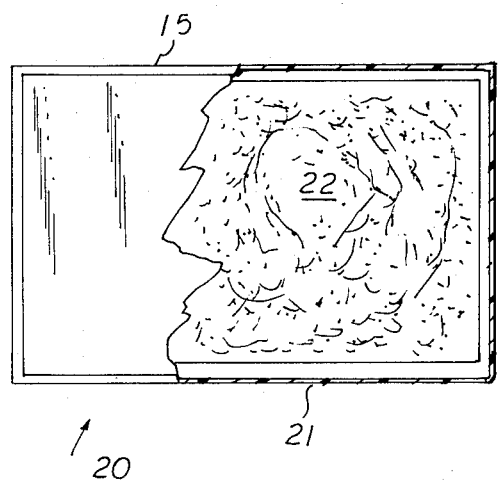
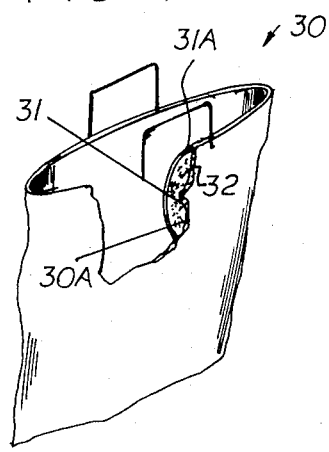

IMPERFORATE DISPENSER FOR DISPENSING VOLATILE MATTER AS GAS AND/OR VAPOR TO A SURROUNDING ATMOSPHERE AND METHOD FOR FORMING SAME

PROBLEM AND PRIOR ART

Heretofore many efforts have been made to perfect a device for dispensing an odoriferous material or the like to a surrounding atmosphere. Some of the prior known devices are evidenced in U.S. Letters Patents Numbers 2,431,924; 2,720,419; 2,766,067; 3,134,544 and 3,536,260. Generally such devices comprised of a physically porous container or sachet containing a supply of suitable odor bearing volatile substance, as for example, crystal paradichlorobenzene, pine needles, pellets, or solids of a desired volatile substance whereby the volatile material was allowed to escape through the physical pores or openings of the container or sachet to escape to the surrounding atmosphere.

In my British Pat. No. 599,237, it has been taught that synthetic resins could, during the formation thereof, be impregnated with a suitable volatile material, as for example, an essential oil. This was attained by dispersing the resin in a suitable plasticizer which included a desired essential oil which, when gelled by heat, formed a given article, as for example, a sheet or membrane in which the volatile material was intricately incorporated therein. However, when an essential oil was subjected to such gelling temperatures there would invariably result a change in the chemical properties of the volatile substance which could adversely affect the retention of the fragrance of the volatile oils so incorporated therein. Also this method was limited to the use of volatiles of low volatility.

U.S. Letters Patent No. 3,578,545 granted May 11, 1971, apparently noticing some of the difficulties encountered in impregnating plastic films with a volatile substance, discloses a construction in which a porous plastic sheet is laminated by cement to a pad of woven material in which an odoriferous material is absorbed. However, with this type of construction it is essential that the plastic sheet laminated to the pad be of sufficient porosity to permit a particular odoriferous material to pass therethrough.

OBJECTS

It is an object of this invention to provide an improved dispenser formed of imperforate synthetic resin containing a supply of volatile matter in aqueous emulsion whereby the volatile matter is gradually yielded therefrom in a dry state.

Another object of this invention is to provide an improved sachet formed of synthetic imperforate water insoluble vinyl composition containing an absorbent material or pad impregnated or oversaturated with an aqueous emulsion of a liquid volatile formed with the help of a surfactant in which the volatile matter is gradually yielded through the walls of the sachet in a dry chemically unchanged state to the surrounding atmosphere over a considerable period of time.

Another object is to provide an improved method of forming a device or sachet for dispensing a volatile matter in gaseous and/or vapor form to a surrounding atmosphere.

Another object is to provide an improved dispenser or sachet for dispensing a volatile matter to the surrounding atmosphere and a method of forming the same which is relatively simple, inexpensive, and positive in operation.

Another object is to provide an improved sachet formed of water insoluble vinyl composition having liquid impervious walls containing an aqueous emulsion of a volatile substance and a surfactant wherein the volatile matter is gradually yielded by escaping through the imperforate wall portion of the sachet as a gas or vapor to the surrounding atmosphere over a period of time, which is greater than the time required for an equal amount of said volatile matter to volatilize in its free unconfined state.

BRIEF SUMMARY OF THE INVENTION

The foregoing objects and other features of this invention are attained by a dispensing device comprising a container or envelope formed of a liquid impervious flexible sheet of water insoluble vinyl polymer, copolymer or derivative thereof, as for example, polyvinylchloride having hermetically sealed therein an aqueous emulsion of a volatile substance and a surfactant. The aqueous emulsion may be contained as a liquid within the sealed envelope and/or be impregnated or absorbed in a compressible pad encased in the envelope. The arrangement is such that as the aqueous emulsion wets or permeates the internal surfaces of the envelope whereby the volatile matter in aqueous emulsion is caused to pass directly through the imperforate walls of the synthetic resin envelope, and gradually escape to the surrounding atmosphere as a dry volatile matter in a chemically unchanged state. The permeability of the volatile through the walls of the container is further enhanced by impregnating the external surfaces of the envelope with an aqueous emulsion containing a similar or dissimilar volatile matter.

FEATURES

A feature of this invention resides in the provision of an imperforate sachet or container formed of a synthetic water insoluble vinyl composition containing either a supply or reservoir of aqueous emulsion of a surfactant and volatile matter or a pad impregnated or over-saturated with such aqueous emulsion hermetically sealed within the container from which the volatile matter contained therein is gradually yielded through the imperforate container walls to the surrounding atmosphere in a dry chemically unchanged state.

Another feature of this invention resides in an improved sachet construction capable of yielding volatile matter through imperforate walls to the surrounding atmosphere over a considerable period of time.

Another feature of this invention is to provide an article of manufacture comprising a sealed envelope formed of a synthetic water insoluble vinyl composition arranged to be internally wetted or impregnated by an aqueous emulsion of a volatile and a surfactant and which has been further externally impregnated with an aqueous emulsion of a volatile substance using a surfactant.

Other features and advantages will become more readily apparent when considered in view of the drawings and specifications in which:

FIG. 1 is a perspective view of a dispensing device embodying the invention.

FIG. 2 is a perspective view of a modified dispensing device embodying the present invention.

FIG. 3 is a perspective sectional view taken along line 2—2 on FIG. 2.

FIG. 4 is a top plan view having portions thereof broken away.

FIG. 5 is a perspective view of a specific application of the invention having portions thereof broken away.

Referring to the drawings there is shown in FIG. 1 a dispensing device 10 for dispensing a volatile matter as a dry gas or vapor in a chemically unchanged state to the surrounding atmosphere. The device 10 comprises an envelope 11 formed of a water insoluble resin, e.g., a vinyl polymer, co-polymer or derivative thereof. The envelope in the illustrated embodiment may be formed of polyvinylchloride and it is hermetically sealed about the edges 15 thereof to define an enclosure. Disposed within the sealed envelope of vinyl composition is a source containing a volatile substance. In the form of FIG. 1 the source comprises a reservoir of an aqueous emulsion of a volatile matter and a surfactant 12. The walls of the envelope being formed of sheet vinyl composition, e.g., polyvinylchloride, are thus rendered impervious to liquid and will contain the aqueous emulsion 12 in liquid form within the envelope. The arrangement is such that the internal walls of the vinyl envelope are readily wetted by the aqueous emulsion 12.

It will be understood that the volatile matter emulsified with the help of a surfactant in the aqueous emulsion, depending upon the particular use to which the device is put, may be perfume, medicant, antimicrobial, anti-bacterial, anti-fungal etc. volatile. For example, the volatile matter may comprise the essential oils of various fragrances or perfumes of flowers such as roses, violets, lilacs, etc.; or of the various woods such as cedar, pine, briar and the like; or of flavors such as fruits, as for example, lemon, pineapple, cherry and the like.

The medicinal volatiles may include menthol, camphor, methyl salicylate, eucalyptus, and others.

An anti-bacterial agent which may be enclosed in an aqueous emulsion may comprise cyclohexanol, phenol, thymol or 2-Ethyl Hexyl Salicylate.

It will be understood that other volatiles which can be readily emulsified in water with the help of a surfactant and which are capable of dissolving or swelling the urethane or vinyl polymer, co-polymers or derivatives thereof may be used. Such volatiles may include paradichlorbenzene, orthodichlorbenzene, orthobenzylparachlorphenol, mono sodium mono methyl siliconate, perchlorethylene and many others.

The aqueous emulsion 12 of a desired volatile substance is formed by combining predetermined parts of the volatile material with predetermined parts of a suitable surfactant, where the volatile matter is not chemically structured as containing its own emulsifying agent or surfactant. In general, the aqueous emulsion may be formed by a choice of volatile matter, with the amount and kind of surfactant being dependent upon the emulsificability of the selected volatile matter. A preferred particle size of the aqueous emulsion should range between $1\mu$ and $10\mu$. In the lower particle sizes the emulsion would appear clear to the naked eye, but even at $10\mu$ only slight cloudiness would be observed.

Typical surfactants which may be used with a desired volatile substance to form a suitable aqueous emulsion include polyoxethylene ether, Empilane, KL-20, Tween 85, Tween 20 and Teepol; the latter being tradenames of known surfactants. Other surfactants which may be used to form an aqueous emulsion may include commercially available soaps or detergents; turkey red oil; acacia gums generally and particularly with ethyl alcohol, propyl alcohol etc.

The stability of the aqueous emulsion 12 formed by combining a suitable volatile with a surfactant may be improved by the inclusion of a protective colloid, as for example, polyvinyl alcohol, alginates, methyl cellulose and the like.

A typical formulation for a particular aqueous emulsion 12 in accordance with this invention may comprise one part surfactant to two parts of volatile matter to twenty parts of water. If desired a one-half part of a protective colloid may be added to impart stability to the aqueous emulsion. However, it will be understood that the desired formulation may vary within relatively wide limits to achieve greater or lesser concentration, speed of evaporation and/or residual retention of the volatile material in the end product.

To render the device 10 herein described anti-bacterial, an anti-bacterial volatile may be included in the emulsion. For example, when 2 Ethyl Hexyl Salicylate is added to the aqueous emulsion, a substantially permanent anti-bacterial action is imparted to the formed article.

With the structure thus described, the volatile matter contained in the aqueous emulsion 12 within the envelope 11 will gradually yield and escape through the walls of the envelope to the surrounding atmosphere as a virtually dry, chemically unchanged gas. This it has been discovered is due to the fact that as the interior surfaces of the vinyl envelope 11 is wetted by the liquid aqueous emulsion 12, the volatile matter in the emulsion is impregnated directly into the wall structure of the envelope and because of the internal vapor pressure will thereby gradually permeate through the imperforate walls of the envelope and be relased as a dry gas or vapor to the surrounding atmosphere.

To enhance the release of the volatile matter through the vinyl walls of the envelope, the envelope is immersed in an aqueous emulsion of a volatile matter and a surfactant formulated in a manner hereinbefore described so that the exterior surface of the envelope may be also impregnated from the external side with an aqueous emulsion of a volatile matter and a surfactant.

The external surface of the envelope 11 may be impregnated with an aqueous emulsion containing either a similar or dis-similar volatile relative to the volatile matter contained in the aqueous emulsion 12 confined within the envelope.

The impregnation of the external surfaces of envelope 11 may be accomplished either before or after the aqueous emulsion 12 is sealed within the envelope 11; or before the envelope is formed. After the external surfaces of the envelope have been impregnated with an aqueous emulsion as herein described, it is dried of any excess until it is virtually dry to the touch.

The sachet 10 described, when used as a room freshener, is capable of being effectively utilized over a considerable period of time inasmuch as a relatively large supply of volatile material can be stored within a sachet and which is liberated at a controlled rate which is less than that at which the volatile matter would otherwise volatilize when in a free and unconfined state. Also the sachet or device 10 described may be used in the vacuum chamber of a vacuum cleaner wherein the liberation of the volatile matter can be effected during a vacuum cleaning operation to freshen a room accordingly.

When the volatile matter of the aqueous emulsion 12 constitutes a medicinal volatile, the dispensing device 10 may be utilized in a sick room whereby the inhaled volatile escaping into the atmosphere produces a therapeutic affect on the body. Because the device 10 is dry to the touch it may be placed under one's pillow where the medicinal volatile can be rendered most effective; without danger of soiling the bed clothes or sheets.

With an appropriate anti-bacterial volatile disposed in the aqueous emulsion, the device 10 described may also have application as a sanitizer or disinfectant. As such, it can be particularly effective when used in a clothes dryer during the drying operation to destroy those bacteria which tend to contaminate clothes during a drying operation.

Referring to FIGS. 2 to 4, there is shown a modified form of the invention. In this form, the device 20 comprises an envelope 21 formed of a water insoluble vinyl polymer, co-polymer or derivative thereof similar to that described with respect to FIG. 1. The walls of the envelope 21 are liquid impervious. In this form the source of the volatile matter includes a pad 22 which is hermetically sealed within the envelope 21. The pad 22 is either impregnated or over-saturated with an aqueous emulsion 12 of a volatile matter and a surfactant formulated or formed in a manner hereinbefore described, depending on the material from which the pad is formed.

The pad or piece of material 22 may comprise any material which may be compressible such as cotton, felt, or other natural or synthetic fiber material capable of absorbing or sponging a supply of the aqueous emulsion 12 containing a desired volatile matter.

In lieu thereof the pad or material 22 may be formed of a cellular or foraminous synthetic water insoluble resin composition, as for example, foamed urethane or foamed vinyl, polymers, co-polymers or derivatives thereof. With a pad formed of water insoluble synthetic resin composition as specified, the material of the aqueous emulsion 12 will impregnate directly into the wall structure of the pad. Also a portion of the aqueous emulsion may be physically retained in the cells or pores of the foamed structure, and be retained thereby as in a sponge. The volatile matter impregnated directly into the material of the urethane or vinyl pad 22 will be gradually yielded therefrom over an extended period of time, as a dry gas in a chemically unchanged state, while the portion of the aqueous emulsion 12 retained in the cells or pores defined by the foraminous structure of the pad provides a reservoir to prolong the useful life of the device 20.

The pad 22, whether of natural fiber or of a water insoluble synthetic resin composition as described, is either impregnated or over-saturated simply by immersing the pad 22 in a bath of the aqueous emulsion containing the volatile matter in the presence of a surfactant for a predetermined period of time. The pad thus impregnated or saturated is subsequently encased in a container or envelope 21 which is formed of a water insoluble synthetic resin, i.e., vinyl polymers, co-polymers or derivatives thereof.

It will be understood that the material from which the envelope 11 and 21 is formed, is made in any conventionally known manner. As the envelope 11 and 21 is made of synthetic resin composition, as herein described, the impregnated or over-saturated pad 22 can be readily hermetically sealed within the envelope by a heat seal or fusion seal 15. In the illustrated embodiment the pad 22 is sandwiched between two sheets of synthetic resin composition in which the peripheral edges are welded or fused together to hermetically seal the pad 22 therebetween.

The pad 22 is hermetically sealed within the envelope 21 so that the inner surfaces of the envelope or container are disposed contiguous but free of the pad 22. As the walls of the synthetic resin envelope or container 21 are rendered imperforate any liquified aqueous emulsion with which the pad is impregnated or saturated is confined within the envelope 21 and the external surface of the envelope remains unwetted thereby and is therefore maintained dry to the touch.

Partly because the material of the envelope 11 and 21 is relatively thin, as for example having a thickness of 0.001 to 0.01 inches, it is rendered readily flexible. When the pad 22 functions as a sponge or reservoir for the aqueous emulsion contained within envelope 21, the aqueous emulsion can be readily compressed out of the pad 22 when a compressive force is applied to the outer surface of the envelope. When so compressed, the aqueous emulsion will be forced into the space between the pad and the inner surfaces of the envelope causing the latter to be wetted as the aqueous emulsion is squeezed out of the pad. It has been discovered that when the water insoluble resin composition of the envelope is wetted by an aqueous emulsion of a volatile and a surfactant that there is established a phenomena whereby the volatile substance which is being yielded out of the emulsion permeates directly through the walls of the envelope and escapes to the surrounding atmosphere.

Also when the pad 22 is formed of a urethane or vinyl foam, and is impregnated with an aqueous emulsion of a volatile with the help of a surfactant, as herein described, and the impregnated pad is devoid of any excess aqueous emulsion, the volatile which is yielded thereby as a dry gas will permeate through the walls of the encasing envelope due to the internal vapor pressures occuring within the envelope.

To enhance the operation of the device 20 of FIG. 2 as described, the external surface of the envelope or container 21 is impregnated by an aqueous emulsion of a surfactant and a volatile substance by placing the material of container 21 into a bath of an aqueous emulsion containing a volatile and surfactant. This impregnation of the external surface of the envelope may be made either before the envelope has been formed, or after the saturated or impregnated pad 22 has been hermetically sealed within the envelope.

As hereinbefore described the impregnation of the exterior surface of the envelope 21 enhances the permeation of the volatile through the wall structure of the envelope, and it is immaterial as to whether the exterior surface of the envelope is impregnated with the same or dissimilar volatile from that contained within the envelope 21.

The method by which the sachet herein described may be formed may comprise the steps of forming a suitable emulsion, e.g., by combining one part of surfactant to two parts of volatile matter to twenty parts of water. If desired, the stability of the emulsion may be enhanced by adding one-half part of a protective colloid, e.g., polyvinyl alcohol, alginates, methyl cellulose and the like. A pad 22 is then immersed into a batch of the aqueous emulsion by which the pad, depending upon the nature of its material, is either saturated or impregnated with a supply of the aqueous emulsion. The pad is thereafter removed from the emulsion and placed within an envelope or container formed of a synthetic water insoluble resin composition. The open sides of the container are then sealed or otherwise secured to hermetically seal the pad within the container or envelope. If desired, the entire envelope, with the hermetically sealed saturated pad, is subsequently immersed in the aqueous emulsion of a surfactant and a volatile substance and maintained therein for a predetermined period of time so that the envelope formed of the synthetic resin composition may likewise be impregnated from the external side thereof. The sachet or device is then removed from the emulsion and dried until the external surfaces are virtually dry to the touch. Alternatively the material of the container or envelope may be impregnated by immersion in an aqueous emulsion of a volatile and surfactant prior to forming the envelope.

Drying of the immersed envelope may be accomplished either by the use of a squeegee to remove the external excess aqueous emulsion, or in the alternative the excess emulsion may be removed by centrifuging.

The saturated or impregnated pad 21 is hermetically sealed within the envelope 21 so that the walls of the envelope are contiguous to but free therefrom so that the emulsion physically retained in the pad; when compressed out therefrom, is free to flow in the space defined between the pad and the internal surface area of the container or envelope. The space thus provided permits the volatile matter in the aqueous emulsion to vaporize. The wetting of the interior surface of the synthetic resin envelope by the aqueous emulsion permits the vaporizing volatile matter to permeate through the wall of the envelope to escape into the surrounding atmosphere. Permeation of the volatile matter through the walls of the envelope is enhanced if the material of the container is externally impregnated by an aqueous emulsion of a surfactant and volatile matter formulated as hereinbefore described.

In lieu of an impregnated or saturated pad 22, the container or envelope may be simply filled with a liquid supply of an aqueous emulsion, as seen in FIG. 1.

The advantage of utilizing a compressible pad as herein described permits a physical retention of a supply of the aqueous emulsion in liquid form within the fibers or cellular structure of the pad in sufficient quantity to render the device operative for a considerable period of time, in lieu of maintaining a liquid reservoir of an aqueous emulsion within the envelope. Where the pad 22 is formed of foamed urethane or foamed vinyl, polymers, co-polymers, or derivatives thereof, the device can be rendered operative without the need of any surplus liquid reservoir of an aqueous emulsion physically retained within the cellular structure of the foam. However, the foam pad, in addition to being impregnated, may also function to physically retain a quantity of the aqueous emulsion in liquid form within the cellular structure, which may be compressed by the application of an applied force to cause a wetting of the internal surfaces and to provide an additional supply of aqueous emulsion to prolong the useful life of the device.

Thus the foamed pad of water insoluble vinyl or urethane, polymers, co-polymers or derivatives thereof, may be confined within the envelope 21 either in its impregnated, dry to the touch state, or in an impregnated and wet saturated state. In either event the volatile in vapor or gaseous state released thereby gradually developes an internal vapor pressure which causes the dry gas to permeate directly through the imperforate walls of the envelope, the latter permeation being enhanced when the material of the envelope has likewise been subjected to impregnation by immersion in an aqueous emulsion of a volatile and a surfactant in which the volatile may be either similar or dis-similar to the volatile contained in the internal source within the envelope.

FIG. 5 illustrates a modified form of the invention as applied to a shopping bag, hand bag 30 or the like, which have acquired much popularity. Such bags 30 are frequently made of a relatively heavy gauge plastic material. In the present invention a pocket or sachet 31 is integrally formed on the inside wall of the bag 30. According to this invention the inner wall portion 31A of the pocket or sachet is formed by a patch or piece of water insoluble resin, e.g., a vinyl polymer, co-polymer or derivative thereof, which can be readily attached to the wall of the bag, e.g. by fusion, heat seal, adhesive, or the like. It is preferred that the gauge or thickness of the sachet or packet wall 31A be less than the gauge or thickness of the bag wall 30A. As hereinbefore described the material from which the sachet or pocket wall 31A is formed is impregnated with a volatile matter by immersion in an aqueous emulsion of a surfactant and volatile as hereinbefore described.

Sandwiched between the bag wall portion 30A and the sachet or pocket wall 31A is a pad 32 which has been oversaturated or impregnated with a volatile material depending upon the material thereof as described with respect to FIGS. 1 to 4. With the construction illustrated in FIG. 5, it will be apparent that the volatile contained within the pad 32 will permeate through the inner pocket wall 31A, for the reason that the inner wall 31A is thinner than the outer bag wall 30A and for the further reason that the inner wall being impregnated as herein described enhances the permeation of the volatile matter therethrough. With the construction of FIG. 5, it will be noted that the volatile matter permeating through the inner wall 31 will emit its fragrance to the interior of the shopping bag. It will be further understood that various volatiles may be used as hereinbefore described.

While the invention has been described with respect to particular embodiments thereof it will be readily understood and appreciated that variations and modifications may be made without departing from the spirit or scope of the invention.

What is claimed is:

1. An article of manufacture comprising:
    a liquid impervious envelope formed of a water insoluble vinyl polymer, co-polymer or derivative thereof, a source containing an aqueous emulsion of a volatile matter and a surfactant whereby the volatile matter within said liquid impervious envelop permeates through the liquid impervious wall portions thereof and is thereby gradually released to the surrounding atmosphere as a dry gas, said source being completely enclosed within said envelope.

2. The invention as defined in claim 1 wherein the walls of said envelope are externally impregnated with an aqueous emulsion of a volatile matter and a surfactant.

3. The invention as defined in claim 2 wherein the aqueous emulsion disposed in said source within the envelope, and impregnated into the external surfaces thereof contains the same volatile matter.

4. The invention as defined in claim 2 wherein the aqueous emulsion contained in said source within the envelope, and impregnated into the external surface of the envelope include dis-similar volatiles.

5. The invention as defined in claim 1 wherein said source comprises a pad of material containing said aqueous emulsion of a volatile substance and a surfactant.

6. The invention as defined in claim 5 wherein said pad is free of the walls of the envelope so that the volatile matter yielding therefrom is free to occupy the space between the pad and the internal wall surfaces of said envelope to permit the volatile matter to permeate through the walls of said envelope as dry matter.

7. The invention as defined in claim 1 wherein said source comprises a pad formed of foamed plastic selected fromed the group consisting of foamed urethane, foamed vinly, and the polymers, co-polymers and derivatives thereof, impregnated with said aqueous emulsion of a surfactant and volatile substance.

8. The invention as defined in claim 1 wherein said envelope is formed of a sheet of liquid impervious polyvinylchloride.

9. The invention as defined in claim 1 wherein volatile matter includes an admixture of non-volatile 2-Ethyl Hexyl Salicylate.

10. The invention as defined in claim 1 wherein said envelope is formed of a synthetic resin selected from the group consisting of polyvinylchloride, polyvinylacetate, polyvinyl formal, polyvinyl acetal.

11. An article of manufacture comprising a bag having opposed wall portions,
a pocket wall attached to the inner surface of one of said bag wall portions,
said pocket wall being formed of a water insoluble vinyl polymer, co-polymer or derivative thereof,
said pocket wall being impregnated with an aqueous emulsion of a surfactant and volatile matter,
a pad disposed between said pocket wall and wall portion of said bag,
said pad containing an aqueous emulsion of a surfactant and volatile matter whereby the volatile matter is gradually yielded through the surface of the pocket wall and to the surrounding atmosphere as a dry gas.

* * * * *